United States Patent
Fujita et al.

(10) Patent No.: US 6,852,780 B2
(45) Date of Patent: Feb. 8, 2005

(54) COMPOSITION FOR OPTICAL MATERIAL, OPTICAL MATERIAL AND LENSES

(75) Inventors: Takanori Fujita, Oita (JP); Katsuyoshi Tanaka, Oita (JP); Toshiaki Takaoka, Oita (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/181,834

(22) PCT Filed: Nov. 20, 2001

(86) PCT No.: PCT/JP01/10121

§ 371 (c)(1),
(2), (4) Date: Jul. 19, 2002

(87) PCT Pub. No.: WO02/41042

PCT Pub. Date: May 23, 2002

(65) Prior Publication Data

US 2003/0047722 A1 Mar. 13, 2003

(30) Foreign Application Priority Data

Nov. 20, 2000 (JP) .................................... 2000-352130
Sep. 28, 2001 (JP) .................................... 2001-303305

(51) Int. Cl.⁷ .......................... C08K 5/34; C08K 5/23; C08K 5/13; C08K 5/08
(52) U.S. Cl. ........................ 524/91; 524/88; 524/190; 524/325; 524/358; 524/559; 523/106
(58) Field of Search ..................... 524/88, 91, 190, 524/325, 358, 559, 720; 523/106; 252/182

(56) References Cited

U.S. PATENT DOCUMENTS 5,621,028 A * 4/1997 Lichtenstein et al. ......... 524/91
6,187,844 B1 * 2/2001 Murata ......................... 524/91

* cited by examiner

Primary Examiner—Kriellion A. Sanders
(74) Attorney, Agent, or Firm—Darby & Darby

(57) ABSTRACT

Disclosed are optical materials which effectively absorb UV light up to the long wavelength band, have low specific gravity, and have balanced properties including impact and heat resistances; lenses; and optical material compositions as their starting materials. The composition contains a polymerizable monomer material consisting of at least one di(meth)acrylate of formula (1):

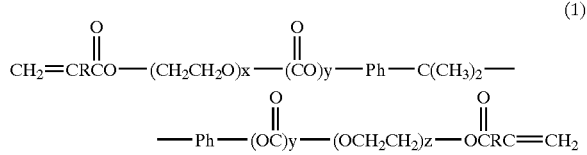

(R: $CH_3$ etc., Ph: a phenylene group; x, z: an integer of 1 to 5; y: 0 or 1) and at least one monomer (M) having at least one vinyl group in one molecule other than monomers of formula (1), and an additive selected from component ($A^1$), ($A^2$), or (B), or mixtures thereof, provided that components ($A^1$) and/or (B) is contained, and when component (B) is contained, components ($A^1$) and/or ($A^2$) is also contained:

($A^1$): a chlorinated benzotriazole UV absorber; ($A^2$): a chlorine-free benzotriazole UV absorber; (B): a coloring agent having absorption maximum in 520–650 nm.

14 Claims, No Drawings

COMPOSITION FOR OPTICAL MATERIAL, OPTICAL MATERIAL AND LENSES

FIELD OF ART

This application is a national phase application under 35 U.S.C. § 371 of International Application No. PCT/JP01/10121, filed Nov. 20, 2001, which was published on May 23, 2002 as International Publication No. WO 02/41042, and claims the benefit of Japanese Patent Application Nos. JP 2000-352130, filed Nov. 20, 2000, and JP 2001-303305, filed Sep. 28, 2001.

The present invention relates to optical materials having excellent UV absorptivity up to a long wavelength band, various superior properties such as heat resistance and impact resistance, and a low specific gravity, optical materials having the above properties and of which yellowing is suppressed, and optical material compositions serving as starting materials for these optical materials.

BACKGROUND ART

Polymer materials composed of organic substances are prone to deterioration by UV light in sunlight, such as decrease in mechanical strength and discoloration. Polymer materials containing highly reactive atoms such as nitrogen or sulfur atoms, aromatic rings, or branched structures, are particularly prone to such deterioration. Such polymer materials prone to photo-deterioration often contain additives such as various UV absorbers, hindered amine light stabilizers, and antioxidants. For example, for production of plastic eyeglass lenses having high refractive indices, UV absorbers for preventing photo-deterioration are often added to polymerizable monomer materials, and the resulting compositions are cured to produce the lenses.

Conventional optical materials containing UV absorbers, such as eyeglass lenses, absorb UV light up to 370 nm or 380 nm, as exemplified by plastic lenses disclosed in JP-60-51706-A. Properties of such plastic lenses were satisfactory when UV dose was so small that its adverse effects on human body were not necessarily considered. However, with the recent increase in UV dose caused by environmentally problematic destruction of the ozone layer, adverse effects of UV light on eyes have become a considerable issue, and the link between UV irradiation and keratitis or cataract has been requiring attention.

JP-1-230003-A proposes, in order to suppress the adverse effects of UV light, a lens containing a general-purpose UV absorber having low absorptivity in the long wavelength band such as 380–400 nm, in the amount of 0.05 to 0.2 wt % of the starting material monomers. This lens does not have sufficient absorption of long wavelength UV lights.

JP-9-269401-A proposes a method of impregnating a lens surface with a general purpose UV absorber similar to the above. This method, however, gives rise to new problems such as decrease in subsequent workability due to the modification of the lens surface material, yellowing of the lens surface, and limitation on the amount of the UV absorber with which to impregnate the lens surface. JP-11-271501-A proposes a method wherein a UV absorber having a low molecular weight of not higher than 360 is used in the amount of 0.7 to 5 wt % of the starting material monomers. With the lens obtained by this method, however, the low-molecular-weight UV absorber may migrate to the lens surface and transpire therefrom in long time wearing, which leads to decline in the UV absorptivity, yellowing, or generation of macule on the lens surface. Further, when the lens is provided with a hard coating, the coating may be peeled off. Even with such a special UV absorber, increase in its content will impair visible light beam transmittance due to the limited solubility of the UV absorber.

The conventional UV absorbers used in the above optical materials also disadvantageously yellow the lenses when added in a large amount for improving their effect, and thus are not suitable for use in producing colorless, transparent lenses. For suppressing such yellowing of lenses, JP-5-195445-A proposes a lens bluing method. This bluing method, however, encounters new problems such as declines in optical properties, UV absorptivity, and impact resistance, depending on the dyes or pigments used for bluing, the plastic materials for the lenses, or the kind and amount of the UV absorber. Thus development of the lenses is desired in which these properties are well balanced.

Incidentally, a variety of materials are conventionally known as plastic materials for use in optical materials, including, for example, diethylene glycol bisallyl carbonate resins, diallyl phthalate resins, thiourethane resins composed of thiol and isocyanate, acryl urethane, and halogenated di(meth)acrylate resins.

DISCLOSURE OF THE INVENTION

It is an object of the present invention to provide optical materials and lenses that effectively absorb UV light including light in the long wavelength band of 380–400 nm without sacrificing their visible light beam transmittance, have low specific gravity, and have excellent and well-balanced properties including impact resistance, heat resistance, and dyeability, as well as optical material compositions serving as the starting materials for the optical materials and the lenses.

It is another object of the present invention to provide optical materials and lenses which effectively absorb UV light including light in the long wavelength band of 380–400 nm without sacrificing their visible light beam transmittance, of which yellowing is sufficiently suppressed, which have low specific gravity, and which have excellent and well-balanced properties including impact resistance, heat resistance, and dyeability, as well as optical material compositions serving as the starting materials for the optical materials and the lenses.

According to the present invention, there is provided an optical material composition comprising:

a polymerizable monomer material consisting of at least one di(meth)acrylate of formula (1):

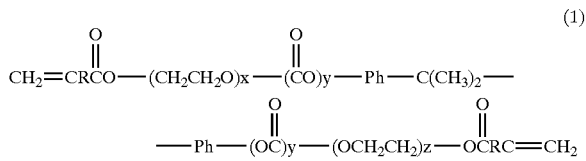

wherein R is a hydrogen atom or a methyl group, Ph is a phenylene group, x and z are the same or different and each denotes an integer of 1 to 5, and y is 0 or 1, and at least one monomer (M) having at least one vinyl group in one molecule thereof other than monomers of formula (1), and an additive selected from the group consisting of component ($A^1$), component ($A^2$), component (B), and mixtures thereof, provided that at least one of components ($A^1$) and (B) is contained, and when component (B) is contained, at least one of components ($A^1$) and ($A^2$) is also contained:

($A^1$): a chlorinated benzotriazole UV absorber;
($A^2$): a chlorine-free benzotriazole UV absorber; and
(B): a coloring agent having its absorption maximum in the range of 520 to 650 nm.

According to the present invention, there is also provided a plastic optical material obtained by curing the above optical material composition in the presence of a radical polymerization initiator.

According to the present invention, there is further provided a lens comprising the above optical material.

PREFERRED EMBODIMENTS OF THE INVENTION

An optical material composition according to the present invention contains a polymerizable monomer material consisting of at least one di(meth)acrylate of formula (1) and at least one monomer (M) other than the monomers of formula (1), and a particular additive mentioned above. As used herein, "di(meth)acrylate" is defined as a polymerizable compound having in its molecule two vinyl groups each originated in a methacrylate or acrylate structure.

In the formula (1), R is a hydrogen atom or a methyl group, and Ph is a phenylene group. X and z are the same or different and each denotes an integer of 1 to 5, preferably an integer of 1 to 3. When x or z is 6 or more, the refractive index and heat resistance of the resulting optical material become low.

Examples of the di(meth)acrylate of formula (1) may include 2,2-bis(4-(meth)acryloxyethoxyphenyl)propane, 2,2-bis(4-(2-(meth)acryloxyethoxy)ethoxyphenyl)propane, 2,2-bis(4-(2-(meth)acryloxyethoxy)diethoxyphenyl)propane, 2,2-bis(4-(2-(meth)acryloxyethoxy)triethoxyphenyl)propane, 2,2-bis(4-(2-(meth)acryloxyethoxy)tetraethoxyphenyl)propane, 2,2-bis(4-(2-(meth)acryloxyethoxycarbonyloxy)phenyl)propane, 2,2-bis(4-((2-(meth)acryloxyethoxy)ethoxycarbonyloxy)phenyl)propane, 2,2-bis(4-(3-(meth)acryloxy-2-hydroxypropyloxy)phenyl)propane, 2-(4-(meth)acryloyloxyethoxyphenyl-2-(4-(meth)acryloyloxydiethoxyphenyl)propane, 2,2-bis(4-(meth)acryloyloxytriethoxyphenyl)propane, 2-(4-(meth)acryloyloxydiethoxyphenyl)-2-(4-(meth)acryloyloxytetraethoxyphenyl)propane, 2,2-bis(4-(meth)acryloyloxytetraethoxyphenyl)propane, 2-(4-(meth)acryloyloxytetraethoxyphenyl)-2-(4-(meth)acryloyloxypentaethoxyphenyl)propane, 2,2-bis(4-(meth)acryloyloxypentaethoxyphenyl)propane, 2-(4-(meth)acryloyloxyhexaethoxyphenyl)-2-(4-(meth)acryloyloxypentaethoxyphenyl)propane, 2-(4-(meth)acryloyloxyoctaethoxyphenyl)-2-(4-(meth)acryloyloxytriethoxyphenyl)propane, and 2,2-bis(4-(meth)acryloyloxynonaethoxyphenyl)propane. These may be used either alone or in combination.

For improved heat resistance of the resulting optical material and facility of control of the curing reaction, the di(meth)acrylate of formula (1) is preferably a di(meth)acrylate with R being a methyl group. For low viscosity and improved workability of the resulting composition, the di(meth)acrylate of formula (1) is preferably a di(meth)acrylate with y being 0. Taking these advantages into consideration, the di (meth) acrylate of formula (1) preferably includes a di (meth) acrylate with R being a methyl group and y being 0.

Further, for improved impact resistance and hue of the resulting optical material, especially for a particularly improved impact resistance, the total amount of di(meth)acrylates with x+z≧6 in the di(meth)acrylate of formula (1) is preferably 50 to 100 mol %, and further the total amount of di(meth)acrylates with x+z≦3 in the di(meth)acrylate of formula (1) is preferably 0 to 30 mol %.

It is preferred that di(meth)acrylates of formula (1) used in the present invention are suitably selected depending on the optical material desired to be obtained, and taking the above various properties into account.

Monomer (M) other than the monomers of formula (1) may be of any kind, as long as monomer (M) is copolymerizable with the di(meth)acrylate of formula (1), is a polymerizable compound having at least one vinyl group acceptable in an optical material, and does not impair the desired effects of the present invention.

Examples of monomer (M) may include, styrene, halogen-substitutedstyrene, methyl-substituted styrene, divinylbenzene, α-methylstyrene, α-methylstyrene dimers, vinylnaphthalene, methyl (meth)acrylate, ethyl (meth)acrylate, benzyl (meth)acrylate, phenyl (meth)acrylate, 2-hydroxyethyl (meth)acrylate, glyceroyl (meth)acrylate, ethylene glycol di(meth)acrylate, diethylene glycol di(meth)acrylate, polyethylene glycol di(meth)acrylate, propylene glycol di(meth)acrylate, polypropylene glycol di(meth)acrylate, glycerine di(meth)acrylate, (meth)acrylate functionallized polyurethanes, 1,4-bis(2-(meth)acryloxyethoxycarboxy)benzene, 4,4'-bis(2-(meth)acryloxyethoxycarboxy)biphenyl, 4,4'-bis(2-(meth)acryloxyethoxy)biphenyl, bis(4-(meth)acryloxyethoxyphenyl)sulfone, bis(4-(meth)acryloxyethoxyphenyl)methane, trimethyolpropanetri(meth)acrylate, pentaerythritoltetra(meth)acrylate, pentaerythritoltri(meth)acrylate, tris(2-(meth)acryloxyethyl)isocyanurate, (meth)acrylic acid, (meth)acrylic amide, N,N-dimethylacrylamide, vinyl acetate, vinyl benzoate, divinyl phthalate, allyl acetate, allyl benzoate, diallyl maleate, triallyl trimellitate, triallyl isocyanurate, maleic anhydride, diisopropyl maleate, diisopropyl fumarate, dicyclohexyl maleate, dibenzyl maleate, dicyclohexyl fumarate, dibenzyl fumarate, and dibenzyl itaconate. Among these examples, styrene, divinylbenzene, α-methylstyrene, α-methylstyrene dimers, benzyl (meth)acrylate, ethylene glycol di(meth)acrylate, diethylene glycol di(meth)acrylate, (meth) acrylic acid, or mixtures thereof is particularly preferred. These may be used as monomer (M) either alone or in combination, depending on various desirous properties to be given to the resulting optical material.

For preventing rapid curing reaction of the composition to obtain a homogeneous optical material with little strains, it is particularly preferred to use an α-styrene dimer as monomer (M). When an α-styrene dimer is used, its content is preferably 0.1 to 10 wt %, more preferably 0.1 to 6 wt % of the total amount of the polymerizable monomer material.

In the polymerizable monomer material, the di(meth)acrylate of formula (1) and monomer (M) may suitably be combined depending on various desirous properties to be given to the resulting optical material.

The content of the di(meth)acrylate of formula (1) is preferably 30 to 98 wt % of the total amount of the polymerizable monomer material, and the content of monomer (M) is preferably 2 to 70 wt % of the total amount of the polymerizable monomer material. With less than 30 wt % of the di(meth)acrylate of formula (1), the resulting lens may have a low refractive index, heat resistance, and mechanical strength, and may have problems in molding. On the other hand, with more than 98 wt % of the di(meth)acrylate, subsequent workability of the resulting lens, such as dyeability and adhesion to a hard coating, may become disadvantageously low.

In addition to the polymerizable monomer material, the composition of the present invention contains an additive selected from the group consisting of component ($A^1$), component ($A^2$), component (B), and mixtures thereof, provided that at least one of components ($A^1$) and (B) is contained, and when component (B) is contained, at least one of components ($A^1$) and ($A^2$) is also contained. In other words, the additive may be in five different combinations including component ($A^1$) alone, a combination of components (A) and (B), a combination of components ($A^1$) and ($A^2$), a combination of components ($A^1$), ($A^2$), and (B), and a combination of components (B) and ($A^2$). These combinations may be categorized into two types, i.e. where component (B) is contained and where component (B) is not contained. When component (B) is contained, yellowing of the resulting optical material may effectively be suppressed, which is particularly advantageous in production of colorless, transparent lenses.

Component ($A^1$) is a chlorinated benzotriazole UV absorber and may, in a small amount, make the resulting optical material effectively absorb UV light up to 400 nm, without impairing its visible light beam transmittance.

Examples of component ($A^1$) may include 2-(2'-hydroxy-3',5'-di-tert-butylphenyl)-5-chlorobenzotriazole and 2-(2'-hydroxy-3'-tert-butyl-5'-methylphenyl)-5-chlorobenzotriazole. These may be used either alone or in combination.

Component ($A^2$) is a chlorine-free benzotriazole UV absorber, and may preferably effectively absorb UV light up to 400 nm without impairing the visible light beam transmittance of the resulting optical material.

Examples of component ($A^2$) may include 2-(2'-hydroxy-5'-methylphenyl)benzotriazole, 2-(2'-hydroxy-3',5'-di-tert-butylphenyl)benzotriazole, and 2-(2'-hydroxy-5'-tert-octylphenyl)benzotriazole. Among these, 2-(2'-hydroxy-5'-methylphenyl)benzotriazole and 2-(2'-hydroxy-5'-tert-octylphenyl)benzotriazole are particularly preferred. These may be used either alone or in combination.

The composition of the present invention contains at least one of the UV absorbers of components ($A^1$) and ($A^2$), and may optionally contain other UV absorbers such as hydroxybenzophenone compounds or salicylate compounds as desired.

The content of the UV absorber of component ($A^1$) and/or ($A^2$) is usually 500 to 50000 ppm, preferably 500 to 30000 ppm of the total amount of the composition. When component ($A^1$) is used, in particular, the desired effects may be achieved in as small an amount as 500 to 5000 ppm. With less than 500 ppm of the UV absorber, sufficient absorptivity of UV light around 400 nm and photo-deterioration suppressing effect may not be given to the resulting optical material. On the other hand, with more than 5000 ppm of the UV absorber, the resulting lens may suffer from deterioration of the surface conditions, yellowing, and low impact resistance and heat resistance. When the content of component ($A^1$) is 500 to 5000 ppm, the contents of the di(meth)acrylate and monomer (M) are preferably 30 to 95 wt % and 5 to 70 wt %, respectively, of the total amount of the polymerizable monomer material.

Component (B) is a coloring agent having its absorption maximum in the range of 520 to 650 nm. This component suppresses the initial yellowing of the resulting optical material. For example, when a blue, violet, or purple coloring agent having its absorption maximum in the above wavelength range, is selected as component (B), the coloring due to the UV absorber of components ($A^1$) and/or ($A^2$) may be achromatized, to give colorless, transparent lenses.

Examples of component (B) may include oil-soluble blue or purple dyes such as anthraquinone, naphthol, monoazo, disazo, and triallylmethane dyes; and blue pigments such as ultramarine blue composed of a sulfur-containing sodium-aluminosilicate, cobalt blue composed of a cobalt oxide and alumina, and phthalocyanine blue composed of copper phthalocyanine.

Examples of the oil-soluble dyes may preferably include C.I. Solvent Blue 11, C.I. Solvent Blue 12, C.I. Solvent Blue 94, C.I. Solvent Violet 11, C.I. Solvent Violet 13, C.I. Solvent Violet 14, C.I. Solvent Violet 31, and C.I. Solvent Violet 33.

The blue pigments are in cobalt or violet, and may preferably be ultramarine blue having the particle size of 0.2 to 5 μm. The pigments may have their particle surfaces pretreated with polysiloxane or silica, for improving dispersibility in an oil system.

In the present composition, the content of component (B), when at least one of components ($A^1$) and ($A^2$) is also contained, is such that the yellow value (b*) in the L*a*b* color specification system is preferably not more than 1.0, more preferably not more than 0.7, when the optical path length is 2 mm. If the yellow value is more than 1.0, the colorlessness of the resulting optical material is not sufficient. On the other hand, the yellow value (b*) is preferably not less than 0 in order not to blue the resulting optical material.

The L*a*b* color specification system, which is defined by CIE (The International Commission on Illumination), is generally used for evaluating object color of plastic optical materials, wherein L* denotes lightness, and a* and b* denote chromaticity including hue and saturation. The value of L* increases from black to white, the value of a* increases from green to red, and the value of b* increases from blue to yellow. The yellow value (b*) of the present composition is determined by measuring hue of the composition enclosed in a quartz cell having the optical path length of 2 mm, with a colorimeter. Here, taking absorption by the UV absorber into consideration, the calorimeter is equipped with a near-UV cut filter so that the chromaticity measured with the colorimeter is consistent with the visually perceived hue.

The content of component (B) is usually 0.01 to 200 ppm, preferably 0.05 to 100 ppm of the total amount of the composition. When the blue pigment mentioned above is used as component (B), its content is preferably 10 to 200 ppm, more preferably 20 to 100 ppm. With less than 10 ppm of the blue pigment, no effect of the pigment is obtained, whereas with more than 200 ppm, the resulting optical material may disadvantageously be blued.

The composition of the present invention may optionally contain, in addition to the additive mentioned above, other coloring agents than component (B) for adjusting chromaticity, or nonionic surface active agents for improving dispersibility of the pigments.

Examples of such other coloring agents may include oil-soluble dyes such as C.I. Solvent Red 52, C.I. Solvent Red 111, C.I. Solvent Red 135, C.I. Solvent Red 146, C.I. Solvent Red 149, C.I. Solvent Red 155, C.I. Solvent Orange 60, C.I. Solvent Orange 86, and C.I. Solvent Green 3; and pigments such as titanium oxide, carbon black, quinacridone red, and perylene red. These may be contained in suitable amounts as long as the desired effects of the present invention are not impaired.

Addition of the nonionic surface active agent is particularly preferred when the blue pigment is used. Examples of the nonionic surface active agent may include those capable of suppressing coagulation and sedimentation of pigments in the composition, such as nonionic surface active agents of an alkyl ether type including polyoxyethylene abbreviated as POE hereinbelow) lauryl ether, POE cetyl ether, POE stearyl ether, and POE oleyl ether; an alkyiphenol type including POE nonylphenyl ether and POE octylphenyl ether; and alkyl ester type including POE monolaurate, POE monostearate, and POE monooleate; a sorbitan ester type including sorbitan monolaurate, sorbitan monostearate, and sorbitan monooleate; and a sorbitan ester ether type including POE sorbitan monolaurate, POE sorbitan monostearate, and POE sorbitan monooleate. These may be used either alone or in combination.

The content of the nonionic surface active agent, if contained, is usually 1 to 200 ppm, preferably 5 to 100 ppm of the total amount of the composition. With less than 1 ppm of the surface active agent, sufficient dispersion stability of the pigments is not achieved, whereas with more than 200 ppm, insufficient curing may be caused.

The nonionic surface active agent may be added together with the pigments and the UV absorber directly to the polymerizable monomer material. However, it is preferred that the nonionic surface active agent is first mixed with all or a part of the polymerizable monomer material in a stirrer, disperser, ball mill, roll mill, or the like device, and then mixed with other components.

The composition of the present invention may optionally contain suitably selected photochromic dyes, demolding agents, antioxidants, fluorescent brightening agents, antibacterial agents, or radical polymerization initiators to be discussed later, in an amount for ordinary use.

The optical material according to the present invention is obtained by curing the composition of the present invention, for example by heating or irradiation with active energy beams, in the presence of a radical polymerization initiator.

Examples of the radical polymerization initiator may include organic peroxides such as diisopropyl peroxydicarbonate, di-2-ethylhexyl peroxydicarbonate, tert-butyl peroxyneodecanoate, tert-hexyl peroxyneodecanoate, tert-butyl peroxypivalate, tert-hexyl peroxypivalate, tert-butyl peroxy-2-ethylhexanoate, tert-hexyl peroxy-2-ethylhexanoate, tert-butyl peroxyisobutyrate, tert-hexyl peroxyisobutyrate, tert-butyl peroxy-3,5,5-trimethylhexanoate, lauroyl peroxide, decanoyl peroxide, benzoyl peroxide, di-3-methyl-3-methoxybutyl peroxydicarbonate, di-sec-butyl peroxydicarbonate, dimethoxyisopropyl peroxydicarbonate, di-2-ethoxyethyl peroxydicarbonate, and di-4-tert-butylcyclohexyl peroxydicarbonate; and azo radial initiators such as 2,2-azobis(2,4-dimethylvaleronitrile), 2,2-azobisisobutyronitrile, and 2,2-azobis(2-methylbutyronitrile). These may be used either alone or in combination. Among these examples, tert-butyl peroxyneodecanoate, tert-butyl peroxy-2-ethylhexanoate, and 2,2-azobisisobutyronitrile are particularly preferred.

The content of the radical polymerization initiator is usually 0.01 to 10 parts by weight, preferably 0.1 to 5 parts by weight, based on 100 parts by weight of the polymerizable monomer material in the present composition. With less than 0.01 parts by weight of the initiator, sufficient curing may not be achieved, whereas with more than 10 parts by weight, strains may be formed in the resulting cured optical material.

The optical material of the present invention may be prepared, for example, by adding to the composition of the present invention a radical polymerization initiator and optionally various additives, introducing the resulting polymerizable material in a mold of a desired shape made of metal, glass, plastic, or other material, heating the material to cure by polymerization, and demolding the cured product. Here, the polymerizable material may directly be molded into a lens by using a mold having a corresponding lens shape. Alternatively, the polymerizable material may be cured by polymerization without a mold. In this case, the resulting optical material may be machined into a lens shape to thereby produce a lens.

The polymerization may be performed usually at 20 to 120° C. for 5 to 72 hours, preferably 10 to 36 hours. The temperature may gradually be raised within the range of 20 to 120° C. The optical material, after being demolded, is preferably annealed in an atmosphere of nitrogen or air at 80 to 130° C. for 1 to 5 hours.

The optical material of the present invention is given improved colorlessness when produced from a composition of the present invention which contains at least one of components ($A^1$) and ($A^2$) together with component (B) as the additive, and which has the yellow value (b*) of not more than 1.0 in the L*a*b* color specification system when the optical path length is 2 mm. With such a composition, an optical material is obtained having the yellow value (b*) of not more than 1.0, preferably not more than 0.7, more preferably not more than 0.5, still more preferably 0 to 0.7, and most preferably 0 to 0.5.

The lens according to the present invention is only required to include the optical material of the present invention in the shape of a lens. The present lens may be provided, for example, with a hard coating layer on its surface for improved scratch resistance. Examples of a hard coating agent for forming the coating layer may preferably include compositions containing as principal components at least one silane compound having a functional group such as an alkoxy, epoxy, or vinyl group, and a colloid of at least one metal oxide such as silicon, titanium, antimony, tin, tungsten, or aluminum oxide.

The hard coating layer may be formed, for example, by applying the hard coating agent to the lens surface through a conventional method such as dipping or spin coating, followed by curing by heating or UV irradiation. A preferred thickness of the hard coating layer is usually about 0.5 to 10 μm.

The lens of the present invention may optionally be provided with a primer layer interposed between the hard coating layer and the optical material, in order to improve the adhesivity between the hard coating layer and the optical material, and the impact resistance of the lens. The present lens may also be provided with an antireflection layer over the hard coating layer. The antireflection layer may be formed of a metal oxide or fluoride such as silicon oxide, magnesium fluoride, aluminum oxide, zirconium oxide, titanium oxide, tantalum oxide, or yttrium oxide, by vapor deposition, sputtering, or the like method.

The lens of the present invention may optionally be subjected to a coloring process using disperse dyes or photochromic dyes for making the lens more fashionable as desired.

The optical materials of the present invention effectively absorb UV light up to 400 nm including 380–400 nm UV light, so that the material provides protection for the eyes and therearound against UV light, while being of excellently light weight. Further, optical materials having superior optical properties such as high refractive index, large Abbe's number, high colorlessness and transparency, and well-balanced properties demanded for lenses including dyeability, heat resistance, and impact resistance, are obtained by suitably selecting the compositions of the present invention.

EXAMPLE

The present invention will now be explained with reference to Examples and Comparative Examples below, which are illustrative only and are not intended to limit the present invention. The following abbreviations in Examples, Comparative Examples, and Tables refer to the compounds mentioned below.

<Monomers>

BME-1: 2,2-bis(4-methacryloxyethoxyphenyl)propane

BME-2: 2,2-bis(4-(2-methacryloxyethoxy)ethoxyphenyl) propane

BME-3: 2,2-bis(4-(2-methacryloxyethoxy) triethoxyphenyl)propane

BMEC-1: 2,2-bis(4-(2-methacryloxyethoxycarbonyloxy) phenyl)propane

BAE-1: 2,2-bis(4-(2-acryloxyethoxy)ethoxyphenyl) propane

EDMA: ethylene glycol dimethacrylate
ST: styrene
BzMA: benzyl methacrylate
MA: methacrylic acid
MSD: α-methylstyrene dimer
ADC: diethylene glycol bisallylcarbonate <UV Absorbers>
Component ($A^1$)
DTCT: 2-(2'-hydroxy-3',5'-di-t-butylphenyl)-5-chlorobenzotriazole
TMCT: 2-(2'-hydroxy-3'-t-butyl-5'-methylphenyl)-5-chlorobenzotriazole
Component ($A^2$)
MPBT: 2-(2'-hydroxy-5'-methylphenyl)benzotriazole
BPBT: 2-(2'-hydroxy-3',5'-di-t-butylphenyl)benzotriazole
UV Absorber other than Components ($A^1$) and ($A^2$)
HMBP: 2-hydroxy-4-methoxybenzophenone <Dyes>
Component (B)
OV: OPLAS VIOLET 732 (manufactured by Orient Chemical Industries, Ltd., C.I. Solvent Violet 14)
MB: MITSUI PS BLUE RR (manufactured by Mitsui BASF Dyes Limited, C.I. Solvent Violet 13)
Dye other than Component (B)
MR: MITSUI PS RED GG (manufactured by Mitsui BASF Dyes Limited, C.I. Solvent Red 111)

<Pigments>
Component (B)
PB: PB-100 (manufactured by Daiichi Kasei Kogyo Co., Ltd.)
SM: SMV-10 (manufactured by Daiichi Kasei Kogyo Co., Ltd.)
Pigment other than Component (B)
RR: RUBICRON RED (manufactured by Tosoh Corporation)

<Surface Active Agents>
NS: polyoxyethylene nonylphenyl ether (manufactured by
NOF Corporation, NS-206)
HS: polyoxyethylene octylphenyl ether (manufactured by NOF Corporation, HS-208)

<Radical Polymerization Initiators>
PND: t-butyl peroxyneodecanoate
PO: t-butyl peroxy-2-ethylhexanoate
IPP: diisopropylperoxydicarbonate Further, in the examples, various material property tests were conducted in accordance with the following methods.

<UV Transmittance>
Using UV/VIS Spectrophotometer V-530 manufactured by JASCO Corporation, transmittances of optical materials in resin plate form and lenses were measured in the wavelength range of 300 to 400 nm, and the wavelength at which transmittance T≧0 and the transmittance at 400 nm were determined.

<Light Beam Transmittance and Yellow Value>
Light beam transmittance was measured with a transmittance photometer manufactured by Nippon Denshoku Industries Co., Ltd. in accordance with JIS K 7105. Also using this transmittance photometer, the yellow values (b*) of compositions, optical materials, or lenses were measured.

<Refractive Index and Abbe's Number>
Using 1 cm×1.5 cm test pieces, refractive index and Abbe's number were measured at 25° C. with an Abbe refractometer DR-M2 manufactured by Atago Co., Ltd.

<Specific Gravity>
Specific gravity of the test pieces was measured in accordance with JIS K 7112 at 25° C. by underwater substitution method.

<Impact Resistance>
16 g, 33 g, and 45 g steel balls were let to fall freely from the height of 127 cm onto optical materials or lenses, and the resulting damage of the samples were observed. ○ indicates that the sample was not damaged, and x indicates that the sample was damaged.

<Heat Resistance>
Using 1 cm×4 cm test pieces, dynamic viscoelasticity were measured with Rheovibron (DDV-III-EP) manufactured by Toyo Baldwin Co., Ltd. The temperature at which tan δ of the dynamic viscoelasticity became maximum was determined as a glass transition temperature (Tg), and employed as an index of heat resistance.

<Dyeability>
Test pieces were immersed in a brown dyeing bath at 92° C. for 10 minutes, and the light beam transmittance after the dyeing was measured with a transmittance photometer manufactured by Nippon Denshoku Industries Co., Ltd.

Examples 1-1 to 1-4

Monomers and UV absorbers were mixed to prepare optical material compositions having the starting material compositions shown in Table 1. To each of the compositions was added a polymerization initiator, and stirred to mix. Then each of the resulting mixture was introduced into a mold composed of two glass disks having 7 cm diameter and an ethylene-propylene rubber gasket of 2 mm thick. The molds were heated from 30° C. to 100° C. over 18 hours in a hot air thermostatic chamber provided with a programmed temperature, and kept at 100° C. for 2 hours. Then the molds were cooled down to 40° C. over 2 hours, and the cured products were demolded to give resin disks. These resin disks were annealed at 100° C. for 2 hours, to thereby obtain optical materials. The optical materials were subjected to the property tests indicated in Table 1. The results are shown in Table 1.

Comparative Examples 1-1 to 1-4

Optical materials were prepared in the same way as in Examples 1-1 to 1-4, except that MPBT was used as the UV absorber. The resulting optical materials were subjected to the property tests. The results are shown in Table 1.

TABLE 1

|  |  | Examples | | | | Comparative Examples | | | |
| --- | --- | --- | --- | --- | --- | --- | --- | --- | --- |
|  |  | 1-1 | 1-2 | 1-3 | 1-4 | 1-1 | 1-2 | 1-3 | 1-4 |
| Monomers (g) | BME-1 | — | 5 | 10 | — | — | 5 | 10 | — |
|  | BME-2 | 18 | — | — | 11 | 18 | — | — | 11 |
|  | BME-3 | — | 10 | — | — | — | 10 | — | — |
|  | BMEC-1 | — | — | 4 | — | — | — | 4 | — |
|  | BAE-1 | — | — | — | 7 | — | — | — | 7 |
|  | EDMA | — | — | — | 1 | — | — | — | 1 |
|  | ST | — | — | 5 | — | — | — | 5 | — |
|  | BzMA | — | 4 | — | — | — | 4 | — | — |
|  | MA | 1 | — | — | — | 1 | — | — | — |
|  | MSD | 1 | 1 | 1 | 1 | 1 | 1 | 1 | 1 |
| ($A^1$) | DTCT (ppm) | 1500 | 1500 | 1500 | 1500 | — | — | — | — |
| ($A^2$) | MPBT (ppm) | — | — | — | — | 1500 | 1500 | 1500 | 1500 |
|  | PND (g) | 0.2 | 0.2 | 0.2 | 0.2 | 0.2 | 0.2 | 0.2 | 0.2 |
| Property of Cured Products | T (400 nm) % | 1.1 | 0.9 | 1.2 | 0.8 | 76.2 | 75.9 | 76.5 | 75.3 |
|  | T≧0 (nm) | 396 | 397 | 398 | 399 | 379 | 378 | 378 | 379 |
|  | Transmittance (%) | 88 | 88 | 89 | 88 | 89 | 89 | 89 | 88 |
|  | Refractive Index (25° C.) | 1.560 | 1.553 | 1.558 | 1.558 | 1.560 | 1.553 | 1.558 | 1.558 |
|  | Abbe's Number | 40 | 41 | 40 | 39 | 40 | 41 | 40 | 39 |
|  | Specific Gravity (g/cm³) | 1.18 | 1.17 | 1.19 | 1.18 | 1.18 | 1.17 | 1.19 | 1.18 |
|  | Impact Resistance (16 g) | ○ | ○ | ○ | ○ | ○ | ○ | ○ | ○ |
|  | Heat Resistance (° C.) | 121 | 125 | 126 | 124 | 122 | 124 | 125 | 124 |
|  | Deability (%) | 28 | 29 | 32 | 30 | 28 | 30 | 31 | 30 |

From the results shown in Table 1, it is understood that the optical materials of Comparative Examples with component ($A^2$) alone as the UV absorber, have insufficient UV absorption up to 400 nm, whereas the optical materials of Examples with component ($A^1$), have sufficient UV absorption up to 400 nm, and also have other properties in good balance.

Examples 2-1 to 2-5

Monomers, UV absorbers, and dyes were mixed to prepare optical material compositions having the starting material compositions shown in Table 2. To each of the compositions was added a polymerization initiator, and stirred to mix. Then each of the resulting mixtures was introduced into a mold composed of two glass disks having 7 cm diameter and an ethylene-propylene rubber gasket of 2 mm thick. The samples were treated in the same way as in Examples 1-1 to 1-4 to give optical materials. The optical materials were subjected to the property tests indicated in Table 2. The results are shown in Table 2. No yellowing was observed even after the optical materials obtained in these examples were left to stand for one year.

Comparative Examples 2-1 to 2-4

Monomers, UV absorbers, or dyeing agents were mixed to prepare optical material compositions having the starting material compositions shown in Table 2. To each of the compositions was added a polymerization initiator, and stirred to mix. Then the samples were treated in the same way as in Examples 2-1 to 2-5 to give optical materials. The optical materials were subjected to the property tests indicated in Table 2. The results are shown in Table 2.

TABLE 2

|  |  | Examples | | | | | Comparative Examples | | | |
| --- | --- | --- | --- | --- | --- | --- | --- | --- | --- | --- |
|  |  | 2-1 | 2-2 | 2-3 | 2-4 | 2-5 | 2-1 | 2-2 | 2-3 | 2-4 |
| Monomers (g) | BME-1 | — | 2 | 10 | — | 2 | — | 2 | 2 | 10 |
|  | BME-2 | 18 | — | — | 11 | — | 18 | — | — | — |
|  | BME-3 | — | 11 | — | — | 11 | — | 11 | 11 | — |
|  | BMEC-1 | — | — | 4 | — | — | — | — | — | 4 |
|  | BAE-1 | — | — | — | 7 | — | — | — | — | — |
|  | EDMA | — | 1 | — | 1 | 1 | — | 1 | 1 | — |
|  | ST | — | — | 5 | — | — | — | — | — | 5 |
|  | BzMA | — | 4 | — | — | 4 | — | 4 | 4 | — |
|  | MA | 1 | 1 | — | — | 1 | 1 | 1 | 1 | — |
|  | MSD | 1 | 1 | 1 | 1 | 1 | 1 | 1 | 1 | 1 |
| ($A^1$) | DTCT (ppm) | — | — | 1500 | 1500 | 1500 | — | — | — | — |

TABLE 2-continued

|  |  | Examples | | | | | Comparative Examples | | | |
| --- | --- | --- | --- | --- | --- | --- | --- | --- | --- | --- |
|  |  | 2-1 | 2-2 | 2-3 | 2-4 | 2-5 | 2-1 | 2-2 | 2-3 | 2-4 |
| ($A^2$) | MPBT (ppm) | 2000 | 2000 | — | — | — | — | — | 2000 | 2000 |
|  | HMBP (ppm) | — | — | — | — | — | 2000 | 2000 | — | — |
| (B) | OV (ppm) | 3.5 | 3 | — | — | 3 | 3.5 | 3 | — | — |
|  | MB (ppm) | — | — | 5 | 5 | — | — | — | — | — |
|  | MR (ppm) | 1.5 | 1 | — | — | 1 | 1.5 | 1 | — | — |
|  | PND (g) | 0.2 | 0.2 | — | — | 0.2 | 0.2 | 0.2 | 0.2 | 0.2 |
|  | PO (g) | — | — | 0.2 | 0.2 | — | — | — | — | — |
|  | Yellow Value of Compositions (b*) | 0.5 | 0.4 | 0.2 | 0.3 | 0.3 | 0.4 | 0.4 | 4.7 | 4.2 |
| Property of Cured Products | T (400 nm) % | 4.1 | 4.0 | 1.2 | 0.8 | 1.1 | 100 | 100 | 4.1 | 4.1 |
|  | T≧0 (nm) | 386 | 397 | 398 | 399 | 398 | 388 | 389 | 386 | 385 |
|  | Transmittance (%) | 85 | 85 | 89 | 88 | 88 | 86 | 86 | 84 | 86 |
|  | Yellow Value (b*) | 0.7 | 0.5 | 0.3 | 0.4 | 0.3 | 0.6 | 0.5 | 5.1 | 4.9 |
|  | Refractive Index (25° C.) | 1.560 | 1.553 | 1.558 | 1.558 | 1.553 | 1.560 | 1.553 | 1.553 | 1.560 |
|  | Abbe's Number | 39 | 41 | 40 | 39 | 41 | 39 | 41 | 40 | 40 |
|  | Specific Gravity (g/cm$^3$) | 1.18 | 1.19 | 1.19 | 1.18 | 1.19 | 1.18 | 1.19 | 1.19 | 1.19 |
|  | Impact Resistance |  |  |  |  |  |  |  |  |  |
|  | (33 g) | ◯ | ◯ | ◯ | ◯ | ◯ | ◯ | ◯ | ◯ | ◯ |
|  | (45 g) | — | ◯ | — | — | ◯ | — | ◯ | ◯ | — |
|  | Heat Resistance (° C.) | 121 | 125 | 126 | 124 | 125 | 121 | 125 | 123 | 123 |
|  | Dyeability (%) | 28 | 29 | 32 | 30 | 29 | 28 | 29 | 30 | 32 |

From the results shown in Table 2, it is understood that the optical materials containing component ($A^2$) as the sole UV absorber, and the optical materials containing component (B) of the present invention but with a UV absorber other than components ($A^1$) and ($A^2$), are inferior in UV absorption up to 400 nm compared to the optical materials of Examples, or yellowing were observed.

Examples 2-6 to 2-15

Monomers, UV absorbers, pigments, and surface active agents were mixed to prepare optical material compositions having the starting material compositions shown in Table 3. To each of the compositions was added a polymerization initiator, and stirred to mix. Impurities were filtered out through a nylon filter with the pore size of 5 μm. Difference in pigment concentrations before and after the filtration was determined from light beam transmittance (460 nm). The results are shown in Table 3. No change was observed in the pigment concentrations, which stayed stably, even after the compositions were left to stand at 40° C. for 30 days.

Then optical materials were obtained in the same way as in Examples 2-1 to 2-5, and subjected to the property tests shown in Table 3. The results are shown in Table 3. No yellowing was observed even after the optical materials obtained in these examples were left to stand for one year.

Comparative Examples 2-5 and 2-6

Monomers, UV absorbers, pigments, and surface active agents were mixed to prepare optical material compositions having the starting material compositions shown in Table 3. To each of the compositions was added a polymerization initiator, and stirred to mix. Impurities were filtered out through a nylon filter with the pore size of 5 μm. Difference in pigment concentrations before and after the filtration was determined from light beam transmittance (460 nm). The results are shown in Table 3.

Then optical materials were obtained in the same way as in Examples 2-1 to 2-5, and subjected to the property tests shown in Table 3. The results are shown in Table 3.

TABLE 3

|  |  | Examples | | | | | | | | | | Comp. Examples | |
| --- | --- | --- | --- | --- | --- | --- | --- | --- | --- | --- | --- | --- | --- |
|  |  | 2-6 | 2-7 | 2-8 | 2-9 | 2-10 | 2-11 | 2-12 | 2-13 | 2-14 | 2-15 | 2-5 | 2-6 |
| Monomers (g) | BME-1 | 2 | 10 | — | 5 | 2 | 10 | — | 5 | 4 | 4 | 2 | 10 |
|  | BME-2 | — | — | 8 | 8 | — | — | 8 | 8 | — | 4 | — | — |
|  | BME-3 | 11 | — | 6 | — | 11 | — | 6 | — | 5 | 5 | 11 | — |
|  | BMEC-1 | — | 4 | — | — | — | 4 | — | — | 5 | — | — | 4 |
|  | BAE-1 | — | — | — | 2 | — | — | — | 2 | — | — | — | — |
|  | EDMA | 1 | — | — | — | 1 | — | — | — | — | — | 1 | — |

TABLE 3-continued

|  |  | Examples | | | | | | | | | | Comp. Examples | |
|---|---|---|---|---|---|---|---|---|---|---|---|---|---|
|  |  | 2-6 | 2-7 | 2-8 | 2-9 | 2-10 | 2-11 | 2-12 | 2-13 | 2-14 | 2-15 | 2-5 | 2-6 |
|  | ST | — | 5 | — | 3 | — | 5 | — | 3 | 5 | — | — | 5 |
|  | BzMA | 4 | — | 4 | — | 4 | — | 4 | — | — | 2 | 4 | — |
|  | MA | 1 | — | 1 | — | 1 | — | 1 | — | — | 1 | 1 | — |
|  | MSD | 1 | 1 | 1 | 1 | 1 | 1 | 1 | 1 | 1 | 1 | 1 | 1 |
| ($A^1$) | DTCT (ppm) | — | — | 1500 | — | 1500 | — | 1500 | — | — | — | — | — |
|  | TMCT (ppm) | — | — | — | 2000 | — | — | — | 2000 | 2000 | 2000 | — | — |
| ($A^2$) | MPBT (ppm) | 2000 | 2000 | — | — | — | 2000 | — | — | — | — | — | — |
|  | HMBP (ppm) | — | — | — | — | — | — | — | — | — | — | 2000 | 2000 |
| (B) | PB (ppm) | 10 | 10 | 9 | 9 | — | — | — | — | 9 | 9 | 10 | — |
|  | SM (ppm) | — | — | — | — | 50 | 60 | 50 | 50 | — | — | — | 60 |
|  | RR (ppm) | 2 | 2 | 1 | 1 | — | — | — | — | 1 | 1 | 2 | — |
|  | NS (ppm) | 9 | — | 7 | — | — | — | — | — | 7 | — | 9 | — |
|  | HS (ppm) | — | 10 | — | 8 | — | — | — | — | — | 8 | — | — |
|  | PND (g) | 0.2 | 0.2 | — | — | 0.2 | 0.2 | — | — | — | — | 0.2 | 0.2 |
|  | PO (g) | — | — | 0.2 | 0.2 | — | — | 0.2 | 0.2 | 0.2 | 0.2 | — | — |
|  | Yellow Value of Composition (b*) | 0.4 | 0.5 | 0.2 | 0.2 | 0.3 | 0.5 | 0.3 | 0.3 | 0.3 | 0.2 | 0.4 | 0.5 |
|  | Change in Pigment Concentration (%) | 94 | 92 | 95 | 96 | 95 | 95 | 94 | 97 | 93 | 98 | 94 | 95 |
| Property of Cured Products | T (400 nm) % | 4.1 | 4.1 | 1.0 | 0.6 | 1.2 | 4.4 | 1.1 | 0.7 | 0.6 | 0.7 | 100 | 100 |
|  | T≧0 (nm) | 382 | 381 | 398 | 398 | 398 | 381 | 397 | 395 | 395 | 399 | 388 | 388 |
|  | Transmittance (%) | 84 | 83 | 89 | 89 | 89 | 86 | 88 | 89 | 88 | 88 | 85 | 86 |
|  | Yellow Value (b*) | 0.6 | 0.6 | 0.3 | 0.3 | 0.3 | 0.7 | 0.4 | 0.4 | 0.4 | 0.3 | 0.6 | 0.7 |
|  | Refractive Index (25° C.) | 1.554 | 1.560 | 1.565 | 1.569 | 1.563 | 1.568 | 1.565 | 1.567 | 1.561 | 1.567 | 1.564 | 1.568 |
|  | Abbe's Number | 40 | 40 | 41 | 40 | 41 | 40 | 41 | 40 | 39 | 41 | 40 | 40 |
|  | Specific Gravity (g/cm$^3$) | 1.19 | 1.19 | 1.18 | 1.19 | 1.19 | 1.19 | 1.18 | 1.19 | 1.17 | 1.18 | 1.19 | 1.19 |
|  | Impact Resistance |  |  |  |  |  |  |  |  |  |  |  |  |
|  | (33 g) | ◯ | ◯ | ◯ | ◯ | ◯ | ◯ | ◯ | ◯ | ◯ | ◯ | ◯ | ◯ |
|  | (45 g) | ◯ | — | — | — | ◯ | — | — | — | — | — | ◯ | — |
|  | Heat Resistance (° C.) | 123 | 123 | 125 | 127 | 122 | 121 | 125 | 127 | 125 | 126 | 122 | 121 |
|  | Dyeability (%) | 30 | 32 | 29 | 32 | 34 | 34 | 28 | 31 | 33 | 28 | 34 | 34 |

Comparative Examples 2-7 to 2-10

Monomers, pigments, UV absorbers, and surface active agents shown in Table 4 were dissolved under heating. 0.6 g of IPP was added as a polymerization initiator, and each of the resulting mixtures was stirred to mix. Then each of the resulting mixtures was introduced into a mold composed of two glass disks having 7 cm diameter and an ethylene-propylene rubber gasket of 2 mm thick. The samples were treated in the same way as in Examples 2-1 to 2-4 to give optical materials. The optical materials were subjected to the property tests indicated in Table 4. The results are shown in Table 4.

Comparative Examples 2-11 to 2-14

A commercially available ADC disk (Comparative Example 2-11), PMMA (Comparative Example 2-12), a PC disk of 2 mm thick (Comparative Example 2-13), and an urethane resin lens (Comparative Example 2-14), were each immersed in a solution (glycerine:isopropyl alcohol:water= 1:1:1 (volume ratio)) containing 5 wt % BPBT as an UV absorber at 50° C. for 30 minutes, washed with water, and dried to have the disk surfaces impregnated with the UV absorber. The resulting resin disks were subjected to the property tests shown in Table 4. The results are shown in Table 4.

TABLE 4

|  | Comparative Examples | | | | | | | |
|---|---|---|---|---|---|---|---|---|
|  | 2-7 | 2-8 | 2-9 | 2-10 | 2-11 | 2-12 | 2-13 | 2-14 |
| ADC (g) | 20 | 20 | 6 | 6 | PADC | PMMA | PC | Urethane Resin |
| DAIP (g) | — | — | 14 | 14 |  |  |  |  |
| MPBT (ppm) | 27000 | — | 27000 | — | Impregnation | | | |
| DTCT (ppm) | — | 1500 | — | 1500 |  |  |  |  |

TABLE 4-continued

|  |  | Comparative Examples | | | | | | | |
|---|---|---|---|---|---|---|---|---|---|
|  |  | 2-7 | 2-8 | 2-9 | 2-10 | 2-11 | 2-12 | 2-13 | 2-14 |
|  | PB (ppm) | 11 | 10 | 10 | 9 | — | — | — | — |
|  | RR (ppm) | 2 | 1 | 2 | 1 | — | — | — | — |
|  | NS (ppm) | 11 | 8 | 10 | 7 | — | — | — | — |
|  | Yellow Value of Composition (b*) | 0.4 | 0.3 | 0.4 | 3.2 | — | — | — | — |
| Property of Cured Product | T (400 nm) % | 7.1 | 0.8 | 6.0 | 1.0 | 39.0 | 56.0 | 67.0 | 33.0 |
|  | T≧0 (nm) | 380 | 395 | 381 | 390 | 383 | 379 | 380 | 378 |
|  | Yellow Value (b*) | 0.8 | 0.5 | 0.7 | 4.9 | 5.3 | 5.9 | 3.7 | 5.2 |
|  | Transmittance (%) | 82 | 85 | 81 | 85 | 92 | 92 | 89 | 91 |
|  | Refractive Index (25° C.) | 1.497 | 1.498 | 1.556 | 1.555 | 1.498 | 1.493 | 1.584 | 1.594 |
|  | Abbe's Number | 57 | 58 | 35 | 36 | 56 | 56 | 29 | 33 |
|  | Specific Gravity (g/cm³) | 1.32 | 1.33 | 1.28 | 1.27 | 1.32 | 1.19 | 1.26 | 1.33 |
|  | Impact Resistance |  |  |  |  |  |  |  |  |
|  | (33 g) | ○ | ○ | X | X | ○ | X | ○ | ○ |
|  | (45 g) | ○ | ○ | — | — | ○ | — | ○ | ○ |
|  | Heat Resistance (° C.) | 88 | 90 | 120 | 124 | 91 | 111 | 135 | 87 |
|  | Dyeability (%) | 30 | 29 | 35 | 36 | 31 | 58 | 82 | 35 |

What is claimed is:

1. An optical material composition comprising:
a polymerizable monomer material consisting of
(a) 30 to 98 wt % of at least one dimethacrylate of formula (1) wherein R is a methyl group, Ph is a phenylene group, x and z are the same or different and each denotes an integer of 2 to 5 and y is 0;

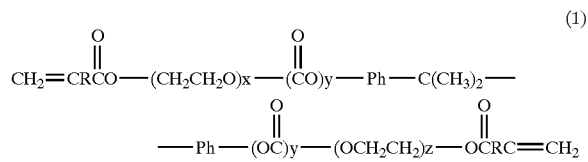

and
(b) 2 to 70 wt % of at least one monomer (M) having at least one vinyl group in one molecule thereof; wherein the at least one monomer (M) is not a di(meth)acrylate having the formula:

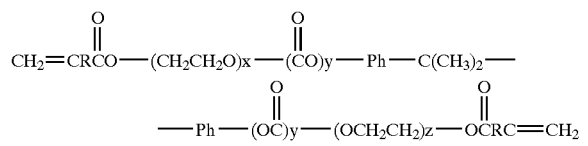

wherein R is a hydrogen atom or a methyl group, Ph is a phenylene group, x and z are the same or different and each denotes an integer of 1 to 5, and y is 0 or 1; and
an additive consisting of 500 to 5000 ppm of a chlorinated benzotriazole UV absorber (A¹) and a coloring agent (B) having its absorption maximum in the range of 520 to 650 nm,
wherein a yellow value (b*) of said composition in the L*a*b* color specification system is not more than 1.0 when an optical path length is 2 mm.

2. The composition of claim 1, wherein said component (B) is selected from the group consisting of an anthraquinone dye, a naphthol dye, a monoazo dye, a disazo dye, a triallymethane dye, ultramarine blue, cobalt blue, phtharocyanine blue, and mixtures thereof.

3. The composition of claim 1 further comprising a nonionic surface active agent.

4. A plastic optical material obtained by curing a composition of claim 1 in the presence of a radical polymerization initiator.

5. The optical material of claim 4, wherein a yellow value (b*) of said optical material in the L*a*b* color specification system is not more than 1.0.

6. A lens comprising an optical material of claim 4.

7. The lens of claim 6, further comprising a hard coating layer on it surface.

8. An optical material composition comprising:
a polymerizable monomer material consisting of
at least one monomer (M) having at least one vinyl group in one molecule whereof other than di(meth)acrylates of formula (1) wherein R is a hydrogen atom or a methyl group, Ph is phenylene group, x and z are the same or different and each denotes an integer of 1 to 5 and y 0 or 1;
at least one dimethacrylate of formula (1) wherein R is a methyl group, Ph is a phenylene group, x and z are the same or different and each denotes on integer of 2 to 5, and y is 0; and
at least one di(meth)acrylate of formula (1) wherein R is a hydrogen atom or a methyl group, Ph is a phenylene group, x and z are the same or different and each denotes an integer of 1 to 5, and y is 0 or 1, and excluding said dimethacrylates of formula (1);

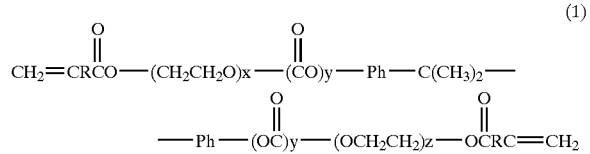

and
- an additive consisting of 500 to 5000 ppm of a chlorinated benzotriazole UV absorber ($A^1$), and a coloring agent (B) having its absorption maximum in the range of 520 to 650 nm, wherein said at least one dimethacrylate of formula (1) is in an amount of 30 to 98 wt % of said polymerizable monomer material, and wherein a yellow value (b*) of said composition in the L*a*b* color specification system is not more than 1.0 when an optical path length is 2 mm.

9. The composition of claim 8, wherein said component (B) is selected from the group consisting of an anthraquinone dye, a naphthol dye, a monoazo dye, a disazo dye, a triallymethane dye, ultramarine blue, cobalt blue, phtharocyanine blue, and mixtures thereof.

10. The composition of claim 8 further comprising a nonionic surface active agent.

11. A plastic optical material obtained by curing a composition of claim 8 in the presence of a radical polymerization initiator.

12. The optical material of claim 11, wherein a yellow value (b*) of said optical material in the L*a*b* color specification system is not more that 1.0.

13. A lens comprising an optical material of claim 11.

14. The lens of claim 13, further comprising a hard coating layer on its surface.

* * * * *